3,387,028
RECOVERY OF GLUTAMIC ACID FROM A FERMENTATION BROTH CONTAINING THE SAME

Yoshihisa Sugita, Kawasaki-shi, Kanagawa-ken, and Isamu Komori and Yoshio Tsuchiya, Yokohama-shi, Kanagawa-ken, Japan, assignors to Ajinomoto Co., Inc., Tokyo, Japan
No Drawing. Filed Aug. 7, 1963, Ser. No. 300,658
Claims priority, application Japan, Aug. 25, 1962, 37/35,127
1 Claim. (Cl. 260—527)

This invention relates to the manufacture of glutamic acid by microbial fermentation, and more particularly to the recovery of the glutamic acid from a fermentation broth.

It is known that certain microorganisms, particularly bacteria, produce glutamic acid in a nutrient medium which contains carbohydrates as a carbon source and ammonium salts or urea as a nitrogen source. When fermentation is terminated, the aqueous nutrient broth contains not only gultamic acid, but also other amino acids, unfermented carbohydrates and residual nitrogen bearing compounds such as ammonium salts, together with minor amounts of organic acids other than amino acids, and of inorganic salts other than ammonium salts. The glutamic acid and other constituents of the broth are mainly in solution in the aqueous liquid, but bacterial cells are suspended therein.

Glutamic acid may be crystallized from its aqueous solutions by adjusting the pH of the solution to the isoelectric point of glutamic acid. The pH of a fermentation broth obtained from conventional fermentation procedures is normally between values of 7 and 8, and the broth is substanntially neutral. At pH 3.2 and 25° C., the solubility of glutamic acid is 0.864 gram per 100 grams water, while its solubility in a fermentation broth acidified to such a pH value is increased to as much as 1.5 to 3.0 grams per 100 grams mother liquor.

When an attempt is made to increase the recovery of glutamic acid by evaporating a portion of the water content of the fermentation broth, the crystals obtained have inferior characteristics which make them difficult to filter and to wash, and the purity of the crystalline material recovered is low.

An object of the instant invention is the recovery of glutamic acid from aqueous fermentation broths in high yields and in crystals which have desirable processing characteristics and high purity.

Another object is a process for such recovery of glutamic acid crystals which is simple and inexpensive in its operation.

A further object is the provision of a recovery process which does not require complex processing equipment, nor materials of construction resistant to corrosive reagents such as strong acids.

Yet another object of the invention is a process for the recovery of glutamic acid from a fermentation broth which is carried out entirely at ambient temperature.

With these and other objects in view, the invention in one of its aspects resides in a treatment of a fermentation broth of the type discussed in which an acid solution of zinc glutamate is added to the fermentation broth in amounts sufficient to adjust the pH of the mixture to a value between 2.5 and 4.0, whereby glutamic acid is crystallized from the remainder of the mixture. The crystals are separated from the mother liquor, and the pH of the latter is adjusted to the range between 5.5 and 7.5.

We have found that the presence of zinc ions does not affect the crystallization of glutamic acid near the isoelectric point of the latter, and that zinc glutamate is practically insoluble in the mother liquor between pH 5.5 and pH 7.5. Adjustment of the pH of the latter thus causes the crystallization of zinc glutamate. The zinc glutamate may then be returned to the process to enrich another batch of fermentation broth with glutamic acid. The resulting higher glutamic acid concentration of the latter has been found to improve the characteristics of the crystals formed at the isoelectric point of glutamic acid.

While we prefer to dissolve the zinc glutamate in a strong acid prior to addition to a fermentation broth, the acid and zinc glutamate may be added directly to the fermentation broth if adequate precautions are taken to avoid contamination of the glutamic acid crystals formed by undissolved zinc glutamate. The amount of zinc glutamate added to the broth should be greater than the amount of zinc glutamate capable of being dissolved in the broth at a pH between 5.5 and 7.7, but it may be increased at will above this value as long as the acid simultaneously added is present in an amount sufficient to keep the pH of the broth below 4.0 whereby the glutamic acid is caused to crystallize while zinc ions are kept in solution.

The strong acids, an excess of which may be employed for dissolving the zinc glutamate, include sulfuric acid which is preferred because of its low cost, and all other acids stronger than glutamic acid whose zinc salts are readily soluble over the pH range in which the method of this invention operates, that is, between pH 2.5 and 7.5. The reagents employed for raising the pH of the mother liquor after the crystallization of glutamic acid are similarly non-critical, and may be selected according to cost and availability. Sodium hydroxide and ammonia will usually be most advantageous, and ammonia may be employed in the liquid or gaseous form, or as an aqueous solution of ammonium hydroxide.

Some zinc ions are lost with the mother liquor from the second crystallization step, and must be replaced if the process is to be carried out as a continuous batch process. Since the ions of most organic or inorganic acids are without effect on the two crystallizaion steps of the invention, most commercially available zinc salts may be admixed to the process liquor at any time prior to the crystallization of zinc glutamate. Zinc sulfate and the double sulfates of zinc with ammonium or sodium are convenient sources of zinc ions, but any other zinc salt readily soluble in water betwen the pH values of 2.5 and 7.5 is equally suitable. An excess of zinc ions present is beneficial in reducing the solubility of zinc glutamate.

The effectiveness of the zinc ions present during the second crystallization step in removing glutamic acid from the mother liquor is evident from the residual glutamic acid solubility in a typical fermentation broth at 25° C. and at various pH values in the presence of zinc ions as listed in Table I.

TABLE I

| Glutamic acid content (g./100 ml.) | pH value |
|---|---|
| 3.2 | 4.5 |
| 1.3 | 5.0 |
| 0.5 | 5.5 |
| 0.3 | 6.7 |
| 0.6 | 7.5 |
| 5.0 | 8.0 |

It is seen that zinc glutamate is substantially insoluble in the aqueous medium at pH 5.5 to pH 7.5 so that practically all glutamic acid remaining in the mother liquor after the first crystallization is recovered in the form of crystalline zinc glutamate in the second crystallization step. When the process of the invention is performed as a continuous batch method, recovery of the glutamic acid from the fermentation broth is virtually complete.

The crystals obtained in both steps are well defined and large enough to be capable of separation from the mother liquors by centrifuging or by simple decantation. The remainder of insoluble material dispersed in the mother liquors mainly consists of bacterial cells whose specific gravity is much lower than that of glutamic acid or zinc glutamate crystals. The cells are therefore readily separated from the crystals without filtration, an operation difficult to perform in the presence of suspended bacterial cells.

The glutamic acid crystallized from the fermentation broth without evaporation of water, and without the use of strongly active reagents is almost colorless and very pure.

The zinc ions present in the mother liquor after the second crystallization step may be recovered, if so desired, by selective adsorption on an ion exchange resin, by concentration of the mother liquor and crystallization of the zinc in the form of zinc sulfate and other inorganic zinc salts, or by precipitation of the zinc ions as zinc hydroxide by means of alkali or alkaline earth metal hydroxides.

The following examples are further illustrative of the method of the invention, but it will be understood that the invention is not limited thereto.

Example 1

24.5 kilograms wet zinc glutamate crystals obtained in the second crystallization step of a previous run were dissolved in 78.0 kilograms 30 percent sulfuric acid. The resulting acid solution was admixed to 514 liters of a fermentation broth containing 34.2 kilograms glutamic acid, whereby the pH of the mixture was adjusted to 3.2. The fermentation broth was obtained by a process as described in a copending U.S. application Ser. No. 109,234 filed on Feb. 2, 1961, now Patent No. 3,128,237.

When the crystallization of glutamic acid was completed, the mother liquor and suspended bacterial cells were separated from the glutamic acid by centrifugal classification. The glutamic acid crystals were washed with an equal weight of water and dried. Their weight was 34.4 kilograms, their purity 97 percent.

The mother liquor was mixed with 105 liters of a zinc sulfate solution containing 6.35 kilograms zinc, and with sufficient 45% sodium hydroxide solution to adjust the pH to 6.5. A crop of well defined coarse zinc glutamate crystals was obtained, and was separated from the mother liquor and the cells suspended thereby by decantation. The crystals weighed 24.5 kilograms when wet, and were returned to the process for the treatment of the next batch of fermentation broth prior to crystallization of glutamic acid therefrom.

That batch was processed in the same manner as described above, but the zinc glutamate was dissolved in 39.8 liters concentrated hydrochloric acid instead of the 78.0 kilograms sulfuric acid. The results obtained were the same. The glutamic acid crystallized weighed 34.4 kilograms and was 97 percent pure.

Example 2

34,800 liters of a fermentation broth which had been obtained by the known process described in U.S. Patent No. 3,096,254 and more specifically, in Example 3 of the patent and contained 1,740 kilograms glutamic acid were adjusted to pH 3.1 by addition of a solution obtained by mixing 1,990 kilograms zinc glutamate crystals, as recovered wet from a previous operation, 7,140 liters 20.4 percent sulfuric acid, and 820 liters of an aqueous mother liquor containing 400 kilograms glutamic acid from which monosodium glutamate had been crystallized. The glutamic acid crystals precipitated from the acidified fermentation broth were coarsely granular and weighed 1,980 kilograms (dry weight). Their purity was 95 percent.

The mother liquor separated from the glutamic acid crystals by centrifugal classification was mixed with 580 liters concentrated aqueous ammonium hydroxide and 1,500 kilograms zinc sulfate. The pH of the mixture was 6.5. Well defined zinc glutamate crystals were obtained in a yield of 1,990 kilograms (wet) and were returned to the process for use with the next batch of fermentation broth.

While the invention has been described with particular reference to specific embodiments, it is to be understood that it is not limited thereto, but is to be construed broadly, and restricted solely by the scope of the appended claim.

What is claimed is:

1. A method of recovering glutamic acid from an approximately neutral aqueous fermentation broth containing said glutamic acid and bacterial cells, which comprises:
   (a) admixing to a portion of said broth a solution of zinc glutamate in an amount of a strong acid sufficient to make the pH of the resulting mixture between 4.0 and 2.5, whereby a portion of said glutamic acid is crystallized, the remainder of said mixture constituting a mother liquor containing said cells;
   (b) separating the crystallized glutamic acid from said remainder;
   (c) raising the pH of said mother liquor in the presence of said cells to a value between 5.5 and 7.5, whereby another portion of said glutamic acid is crystallized from said remainder in the form of zinc glutamate crystals;
   (d) separating said zinc glutamate crystals from said mother liquor and from said cells;
   (e) dissolving said zinc glutamate crystals in an excess of a strong acid, whereby an acid solution of zinc glutamate is obtained;
   (f) admixing said acid solution to another portion of said broth in an amount sufficient to adjust the pH of the resulting mixture to a pH value between 4.0 and 2.5, whereby yet another portion of said glutamic acid is crystallized; and
   (g) recovering the last mentioned portion of said glutamic acid.

References Cited

UNITED STATES PATENTS

| | | | |
|---|---|---|---|
| 2,849,468 | 8/1958 | Cardinal | 260—527 |
| 2,929,839 | 3/1960 | Hoglan | 260—527 |
| 3,029,280 | 4/1962 | Motozaki et al. | 260—527 |
| 3,278,572 | 10/1966 | Frump | 260—527 X |

FOREIGN PATENTS

| | | |
|---|---|---|
| 216,545 | 8/1948 | Australia. |
| 626,335 | 4/1963 | Belgium. |

LORRAINE A. WEINBERGER, *Primary Examiner.*

I. PELLMAN, M. WEBSTER, *Assistant Examiners.*